Patented Oct. 7, 1941

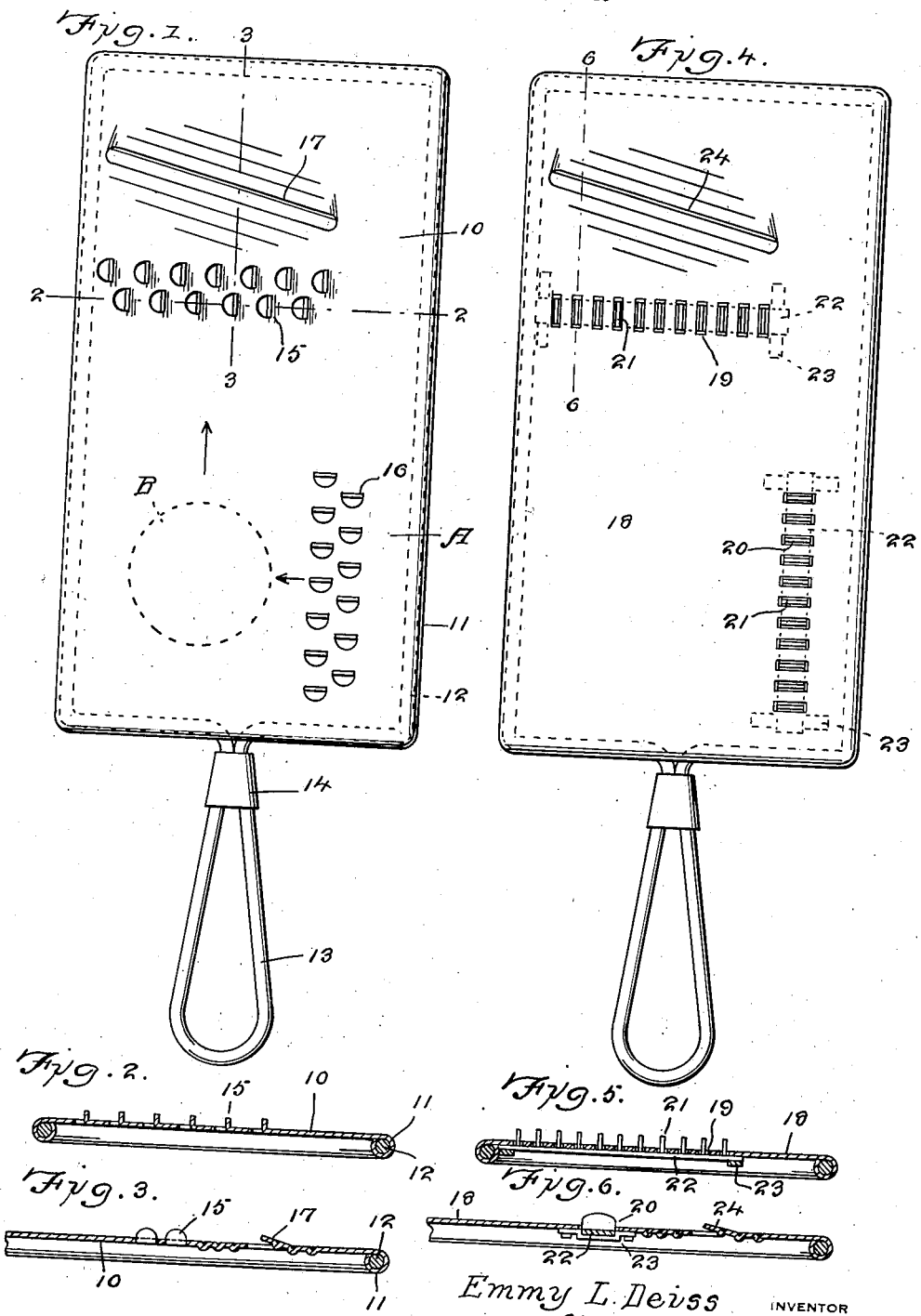

2,258,087

UNITED STATES PATENT OFFICE 2,258,087

VEGETABLE CUTTER

Emmy L. Deiss, Los Angeles, Calif.

Application May 20, 1940, Serial No. 336,275

3 Claims. (Cl. 146—180)

The invention relates to a vegetable cutter and more especially to an onion slicer or cutter.

The primary object of the invention is the provision of a device of this character wherein the same serves as a kitchen utensil designed for the cutting of vegetables or the slicing thereof in that onions can be severed on lines at right angles to each other thereby producing cubes therefrom.

Another object of the invention is the provision of a device of this character wherein the cutters are arranged in groups at substantially right angles to each other so that the device can be used for the severing of vegetables, particularly onions, into small pieces and of a definite shape, thereby rendering the device useful as a kitchen utensil, the cutting operation being carried forth with dispatch and without inconvenience to the user of the device.

A further object of the invention is the provision of a device of this character, which is simple in its construction, thoroughly reliable and effective in operation, handy, strong, durable, and inexpensive to manufacture.

With these and other objects in view, the invention consists in the features of construction, combination and arrangement of parts as will be hereinafter more fully described in detail, illustrated in the accompanying drawing, which discloses the preferred and modified forms of embodiment of the invention and pointed out in the claims hereunto appended.

In the accompanying drawing:

Figure 1 is a plan view of a device constructed in accordance with the invention.

Figure 2 is a sectional view taken on the line 2—2 of Figure 1.

Figure 3 is a fragmentary sectional view taken on the line 3—3 of Figure 1.

Figure 4 is a view similar to Figure 1 showing a modification.

Figure 5 is a transverse sectional view thereof.

Figure 6 is a fragmentary enlarged sectional view taken approximately on the line 6—6 of Figure 4.

Similar reference characters indicate corresponding parts throughout the several views in the drawing.

Referring to the drawing in detail, particularly Figures 1 to 3, inclusive, the device A constituting the present invention comprises a permanently flat single sheet of metal, particularly steel, effecting a work bed 10. The sheet is of suitable size and thickness, being preferably of substantially rectangular shape, while marginally thereof is an inwardly curled edge 11 accommodating a wire frame 12, which at one end is extended and formed at this extended end into a handle 13, the latter being braced at 14.

Located at right angles to each other and struck up from the bed 10 at required distances from each other are groups of cutting teeth 15 and 16, respectively. The teeth of each group are preferably staggered in spaced relation to each other and when a vegetable is placed upon the bed 10 and moved in the direction of the groups of teeth 15 and 16 in single order such vegetable will become sliced or cut into pieces, either in strip or cube form.

The bed 10 at one point thereof has struck or bent therefrom a cutting blade 17, being disposed on the bias and is upwardly struck from the said sheet of metal constituting the bed 10. The purpose of this cutting blade 17 is to cut vegetables into strips or slices of uniform thickness from edge to edge. The cutting edge of the blade 17 is straight throughout the major extent thereof and this blade in the functioning thereof reinforces the bed 10.

In Figures 4 to 6, inclusive, there is shown a modification of the invention wherein the bed 18 has formed therein spaced rows of slots 19 and 20, respectively. These rows are at right angles to each other and therethrough project cutting teeth 21, those of each row being carried upon a supporting bar 22 having its ends engaged in looplike hanger straps 23 built upon the under or lowermost side of the bed 18. In this manner when the teeth 21 become damaged in either or both rows, the same can be removed for conditioning thereof or placement of new teeth if the occasion requires. The bed 18 is also built with the knife or slicing blade 24 similar to the knife or blade 17 hereinbefore described.

The hanger straps can be detachably or permanently made secure to the bed 18 at the option of the manufacturer of the article or device.

In Figure 1 of the drawing there is shown by dotted lines the locating of a vegetable such as an onion B in position with respect to the device A for the slicing or cutting operation while the arrows in this view are indicative of the direction of movement of the vegetable for the cutting operation of the device.

The frame 12 is made from rigid wire to give rigidity and durability to the device and also to support the bed thereof, the said bed being permanently attached to the frame under manufacture of the article.

By reason of the location of the group of cutting teeth 15 with respect to the knife or blade 17, it is possible in a single stroke to first complete a plurality of kerfs or cuts into the vegetable and thereafter slice the latter at the points where previously cut by the teeth and in this manner pieces of striplike character will be had. Also it is possible to cut cubes from the vegetable acted upon by the teeth in both groups and the knife or blade.

What is claimed is:

1. A device of the character described comprising a single permanently flat sheet of metal having rows of spaced teeth projecting from one side thereof, the teeth of one row being at substantially right angles to the teeth of the other row, a cutting blade struck up from the sheet and disposed diagonally at one side of one row of teeth, a wire frame attached marginally to said sheet and terminating in a handle beyond one end of the sheet, and a bar having the teeth formed therewith and attached to the sheet.

2. A device of the character described, comprising a flat base, a transverse row of cutting blades arranged at one end of the base with their cutting edges extending longitudinally thereof, a longitudinal row of cutting blades at one side of the base with their cutting edges extending transverse the base, and a cutting blade beyond the transverse row of cutting blades and of a length equal to the said row.

3. A device of the character described, comprising a flat base, a row of cutting blades arranged thereon, a second row of cutting blades arranged at right angles to the first row of cutting blades and to one side thereof on the base, and a cutting blade beyond one row of cutting blades and of a length equal to said last mentioned row of blades and co-extensive with said row.

EMMY L. DEISS.